July 16, 1940.  M. J. McANENY, JR  2,208,134
TOOL FOR APPLYING HOSE CLAMPS
Filed Sept. 8, 1937
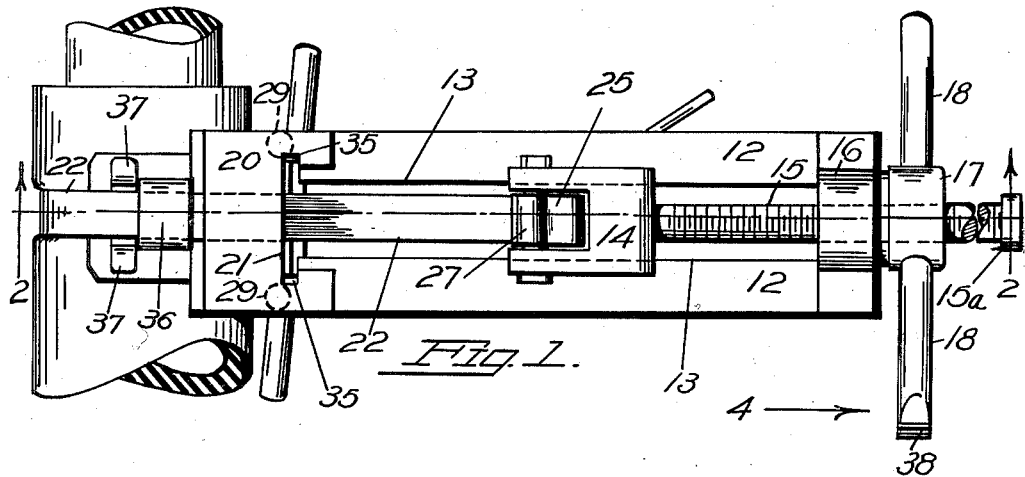
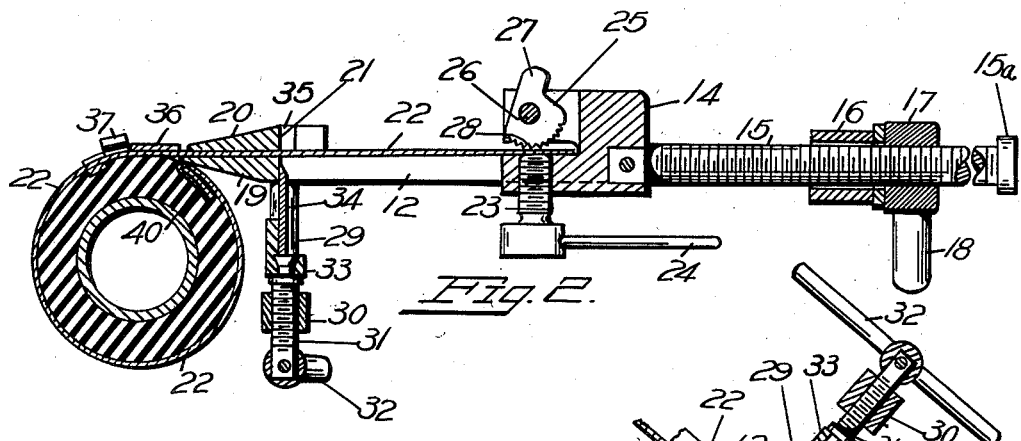
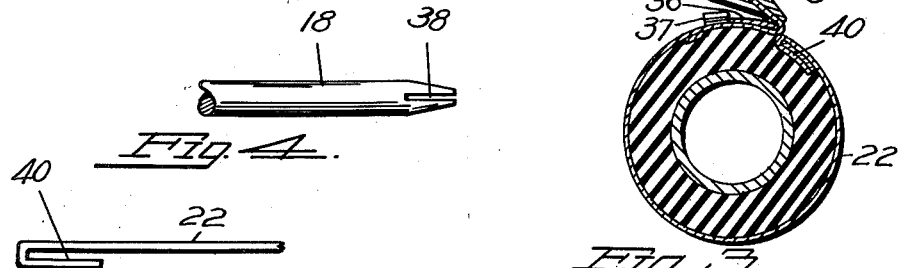
INVENTOR.
M. J. McAneny Jr.
ATTORNEY.

Patented July 16, 1940

2,208,134

UNITED STATES PATENT OFFICE 2,208,134

TOOL FOR APPLYING HOSE CLAMPS

Michael J. McAneny, Jr., Denver, Colo.

Application September 8, 1937, Serial No. 162,916

2 Claims. (Cl. 81—9.3)

This invention relates to improvements in hose-clamp tools.

It is an object of the invention to provide a tool for drawing a hose clamp securely around, and in clamping engagement with a hose, in a novel manner.

Another object is the provision of such a tool that will engage a hose clamp quickly and securely.

A further object is to provide a tool for a hose clamp that can be used effectively with various diameters of hose and different lengths and thicknesses of clamp-bands and that can be used to cut off surplus material from the clamp before and after its application to a hose.

A still further object is the provision of a hose-clamp tool that may be used in locking the clamp after its tightening around a hose.

Other objects and advantages reside in details of design and construction that will be more fully disclosed in the following description and in the drawing wherein like parts have been similarly designated and in which:

Figure 1 is a plan view of a hose-clamp tool made according to the present invention, and shown in operative position;

Figure 2 is a longitudinal sectional view taken on line 2—2 of Figure 1;

Figure 3 is a fragmentary sectional view showing a further advanced step in the use of the tool;

Figure 4 is a fragmentary detail taken in the direction of the arrow 4 of Figure 1; and Figure 5 is a fragmentary detail of a hose-clamp band, drawn on a larger scale, showing a use of the improved tool.

As is well known to those skilled in the art, the union of a flexible hose to a pipe, metallic nipple, or the like requires a dependable hose clamp, particularly where the hose is to carry high pressure fluid.

The tool that is the subject of the present invention is particularly well adapted to be used in applying a hose clamp of the type disclosed in my co-pending application of even date, Serial No. 162,917.

In the drawing, a frame is indicated by reference character 12, having a slot-like opening along its center as at 13, in which is mounted a slide 14, that is attached to an actuating screw 15.

The screw is journalled at 16 at the end of the frame, and a hand thrust-nut 17 has handles 18 to be manually operated against the journal to move the screw outwardly of the frame.

The forward or left end of the frame terminates in a beveled end 19, adjacent which is an oppositely beveled shear plate 20 having a clamp-shearing edge 21. The plate is spaced from the frame along the central area thereof to provide a throat or passage for a hose clamp 22 as shown in Figures 1 and 2. The shear plate may be fastened to the frame by any suitable means such as by screws not shown.

Carried in the slide 14 is a holding screw 23 having a handle 24, above which is an eccentric or cam element 25, pivoted at 26, and having a finger piece 27. The working surface of the eccentric or cam is corrugated or roughened as at 28, and the cam is preferably made of hard material such as tempered steel.

This tool is designed for extremely fast operation and often it may be used to make emergency repairs or the like. Therefore, it is highly advantageous to have a quick-acting band-clamping means on the movable slide, which feature is satisfied in the eccentric 25. As tension is applied to the band, the teeth or serrations shown at 28, on the eccentric 25 tend to dig and cut into the material of the band and after the drawing and locking of the band has been completed, about the only way the remaining band material can be released from the tool is by moving the screw 23 away from the eccentric.

Adjacent the forward end of the frame, is a manually operable hand-shear comprising a pair of posts 29 extending from the frame, that carry a cross head 30 that is tapped to cooperate with a shearing screw 31 having a handle 32. The screw is rotatably connected with yoke 33 that is slidable on the posts 29. The yoke carries a shearing knife 34 that cooperates with the shearing plate 20 along its cutting edge 21, recesses 35 being provided in the frame and in the shear plate to clear the edges of the knife.

After a hose clamp, such as the type disclosed in my co-pending application, has been placed around a hose as illustrated in Figures 1 and 2, the loose end of the clamp band is passed through the throat in the tool and is gripped between the screw 23 and the eccentric or cam 25 in the slide 14. The hand thrust-nut 17 is then rotated to draw the screw and the slide in a direction away from the hose to tighten the clamp thereunder. The eccentric grips the clamp band even more firmly as tightening force is applied. The beveled end 19 of the frame, abuts the bridge portion 36 of the head of the clamp to oppose the drawing force of the thrust-nut. Thus the clamp band is drawn securely around the hose.

When the clamp is sufficiently tightened, the tool is rotated about its beveled end as a fulcrum, to the position shown in Figure 3, to bend the band-end over the edge of the bridge 36. The shearing knife 34 is then advanced by means of the shearing screw 31, to cut off the clamp band at the predetermined correct length to provide a locking end. The locking end is then bent down closely over the head of the band and secured by bending the locking tongues thereover.

The slotted handle as shown at 38 may be used to bend the tongues into their locked position. As the band-end is bent back over the bridge, the thrust-nut 17 may be further tightened to maintain tension on the band. When the locking screw is in its normal gripping position, the end of the band can, normally, be gripped, merely by rotating the eccentric or cam by means of its finger piece 27. The release of the surplus end of the band from the tool is accomplished by unscrewing the holding screw. This screw can be adjusted to cooperate with the eccentric or cam 25, to grip clamp bands of different thickness. The grip is dependable and positive and the greater the tension applied to the band the tighter the eccentric will grip the band.

The end 15a of the screw 15 is enlarged and may be used as a hammer to drive the locking end of the band and the locking tongues of the head into place.

A preferred arrangement of providing the clamp to be used with this tool, is to furnish the head sepaarte from the band, and to provide the band in a bulk roll. Under these conditions the band is cut off to the correct length for the particular hose to be clamped, by the shearing knife 34 of the tool. An end of the band may then be bent into a hook as shown in Figure 5, to engage the head as shown at 40.

The improved tool is used for this operation by inserting a band end a short distance into the throat between the beveled ends 19 and 20 of the tool, to start the bend and then using the hammer 15a to complete the formation of the hook.

What I claim and desire to secure by Letters Patent is:

1. A hose band drawing tool comprising a frame element having a slot-like opening, a slide positioned to move along said opening, a screw extending into the opening for so moving the slide, eccentric band-clamping means on the slide, means on the slide for manually releasing a band from said clamping means, a plate mounted on said frame and spaced therefrom providing a band-receiving opening alined with said slide and having a band-shearing edge across said slot-like opening, and a movable band-shear carried on the frame opposite the shearing edge in a position to cooperate with said edge whereby a hose band can be cut off at a predetermined place.

2. In a hose band drawing tool having a slide member and means for moving the slide to draw a band around the hose, the improvement which comprises a band-clamping eccentric on the slide, another band-clamping member positioned on the slide to cooperate with the eccentric, and manual means for moving said latter one of said band-clamping members bodily away from the other to release material gripped therebetween.

MICHAEL J. McANENY, Jr.